US007639247B2

(12) United States Patent
Chang et al.

(10) Patent No.: US 7,639,247 B2
(45) Date of Patent: Dec. 29, 2009

(54) OUTPUT CIRCUIT IN A DRIVING CIRCUIT AND DRIVING METHOD OF A DISPLAY DEVICE

(75) Inventors: Yaw-Guang Chang, Tainan County (TW); Ming-Cheng Chiu, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 739 days.

(21) Appl. No.: 11/483,080

(22) Filed: Jul. 6, 2006

(65) Prior Publication Data

US 2008/0007545 A1 Jan. 10, 2008

(51) Int. Cl.
*G06F 3/038* (2006.01)
*G09G 5/00* (2006.01)

(52) U.S. Cl. .......................... 345/204; 345/96; 345/98; 345/99; 345/100; 345/208; 345/209; 345/210; 345/211; 345/212; 345/213

(58) Field of Classification Search .................. 345/96, 345/98–100, 204, 208–213
See application file for complete search history.

(56) References Cited

U.S. PATENT DOCUMENTS 5,754,155 A * 5/1998 Kubota et al. ................ 345/98
5,841,702 A * 11/1998 Kim ...................... 365/189.05
6,184,855 B1 * 2/2001 Kobayashi et al. .......... 345/100
6,700,419 B1 * 3/2004 Fan et al. .................... 327/108
7,019,729 B2 * 3/2006 Matsumoto .................. 345/98
7,342,567 B2 * 3/2008 Park ........................... 345/100
7,436,381 B2 * 10/2008 Kim et al. ..................... 345/87
2003/0117353 A1 * 6/2003 Moon .......................... 345/87
2005/0206641 A1 * 9/2005 Morita ....................... 345/211
2006/0187173 A1 * 8/2006 Moon .......................... 345/98

* cited by examiner

*Primary Examiner*—Henry N Tran
*Assistant Examiner*—Viet Pham
(74) *Attorney, Agent, or Firm*—J.C. Patents

(57) ABSTRACT

An output circuit whose outputting signals having large voltage swing by using switches with low voltage tolerance is provided. The output circuit includes: operation amplifiers, receiving positive input voltage and negative input voltages, respectively; transmission gates, passing output signals from the operation amplifiers, respectively; switch transistors, passing output signals from the transmission gates as an output signal of the output circuit, pulling up the output signal from one of the transmission gates, and pulling down the output signal from the other of the transmission gates.

25 Claims, 1 Drawing Sheet

OUTPUT CIRCUIT IN A DRIVING CIRCUIT AND DRIVING METHOD OF A DISPLAY DEVICE

BACKGROUND OF THE INVENTION

1. Field of Invention

The present invention relates to an output circuit in a driving circuit and a driving method of a display device, more particularly to an output circuit in a driving circuit and a driving method of a display device using low voltage switches.

2. Description of Related Art

A liquid crystal display (LCD) has many advantages such as light weight, small size, low power consumption and little radiation, and has been widely used in recent years.

In general, a LCD includes a panel, a gate driver that orderly actuates a gate line of the panel, and a source driver that transmits image data to each source line of the panel. The source driver at least includes a shift register, a data latch, a D/A converter and an output circuit. In polarity inversion, output voltages from the source driver may drive, for example, from +5V to −5V. That is, for positive polarity, the output voltages are from +5V to 0V, and for negative polarity, the output voltages are from −5V to 0V. In this case, to achieve a voltage swing of 10V for the source driver, switches in the output circuit must have a voltage tolerance of at least 10V, which may lead to a large chip area of the source driver.

Therefore, there needs a new output circuit with a small voltage tolerance using low voltage switches, thus reducing the chip area of the source driver.

SUMMARY OF THE INVENTION

One of the objects of the invention is to provide an output circuit with a large voltage swing by using low voltage switches, thus reducing the chip area of the source driver.

To at least achieve the above and other objects, the invention provides an output circuit suitable in a driving circuit for a display device. The output circuit includes: a first operation amplifier, receiving a first input voltage; a second operation amplifier, receiving a second input voltage; a first transmission gate, passing an output signal from the first operation amplifier under control of a first enable signal; a second transmission gate, passing an output signal from the second operation amplifier under control of a second enable signal; a first switch, passing an output signal from the first transmission gate under control of a first switch control signal for generating an output signal of the output circuit; a second switch, passing an output signal from the second transmission gate under control of a second switch control signal for generating the output signal of the output circuit; a third switch, pulling up the output signal from the second transmission gate under control of a third switch control signal; a fourth switch, pulling down the output signal from the first transmission gate under control of a fourth switch control signal; a first inverter, receiving and inverting the first enable signal for generating an inverted signal thereof, the first transmission gate being conducted or non-conducted based on the first enable signal and the inverted signal thereof; and a second inverter, receiving and inverting the second enable signal for generating an inverted signal thereof, the second transmission gate being conducted or non-conducted based on the second enable signal and the inverted signal thereof.

Further, the invention provides a method for driving a display device via low voltage tolerance switches. The method comprises the steps of: amplifying a first input voltage or a second input voltage; passing the amplified first input voltage under control of a first enable signal; passing the amplified second input voltage under control of a second enable signal; switching the passed and amplified first input voltage as a driving voltage for the display device under control of a first switch control signal; and switching the passed and amplified second input voltage as the driving voltage for the display device under control of a second switch control signal.

Further, the amplified first input voltage is passed under control of the first enable signal and an inverted signal thereof. The amplified second input voltage is passed under control of the second enable signal and an inverted signal thereof. The passed and amplified second input voltage is pulled up under control of a third switch control signal. The passed and amplified first input voltage is pulled down under control of a fourth switch control signal. The first input voltage or the second input voltage is amplified in unity gain.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
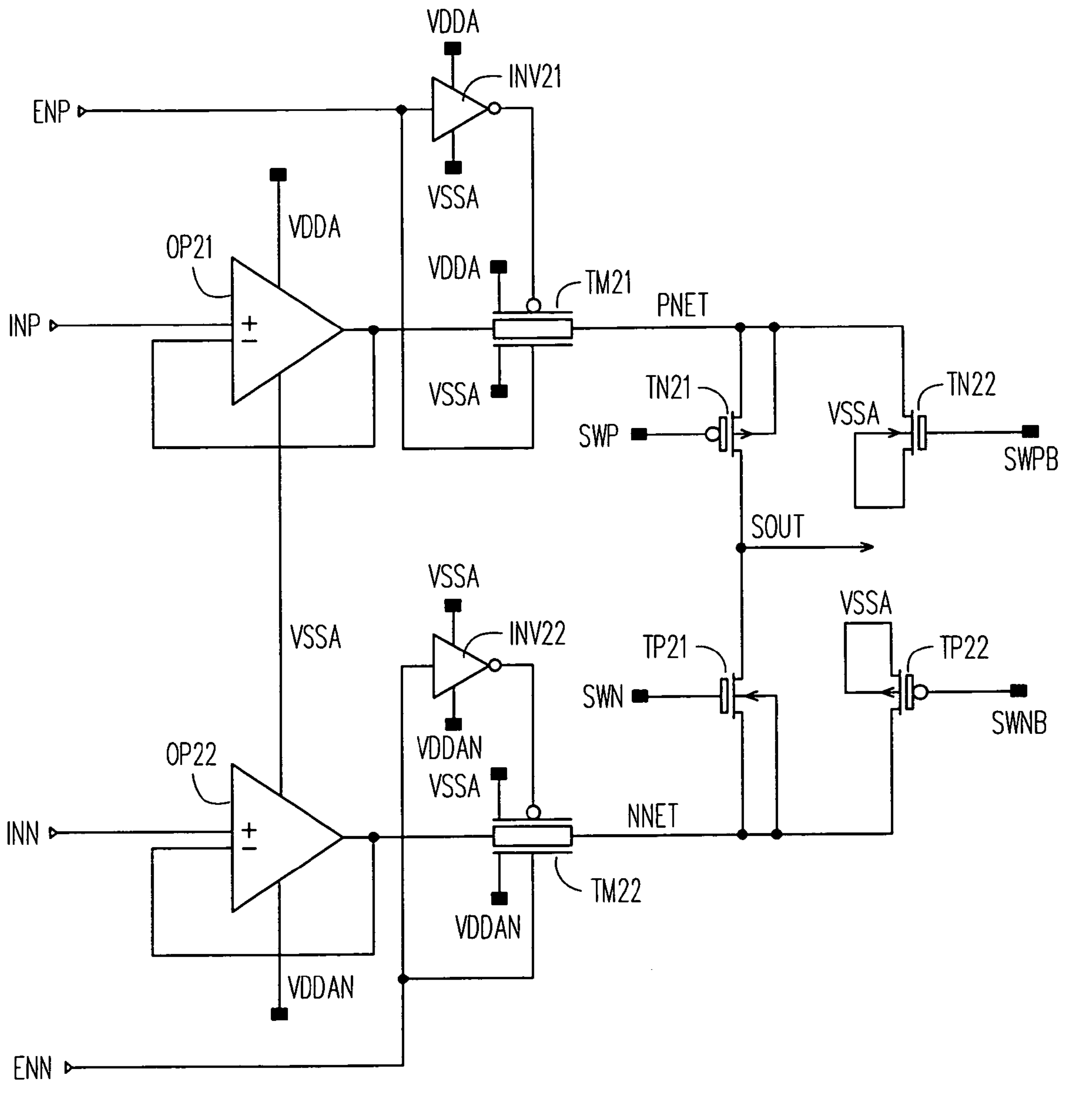
FIG. 1 shows a circuit diagram of an output circuit in a driving circuit for a display device.

Reference will now be made in detail to the present preferred embodiments of the invention, examples of which are illustrated in the accompanying drawing.

In the embodiment, an output circuit can drive a pair of input voltages to an output voltage between +5V to 0V and −5V to 0V only using switches with a voltage tolerance of 5V.

FIG. 1 shows a circuit diagram of an output circuit in a driving circuit for a display device. As shown in FIG. 1, the output circuit includes operation amplifiers OP21~OP22, inverters INV21~INV22, transmission gates TM21~TM22 and switches TP21~TP22 and TN21~TN22. In this embodiment, three reference voltages VDDA (+5V), VSSA (0V) and VDDAN (−5V) are used. In general, only one of the input voltages INP and INN is asserted in the operation of the output circuit. In other words, if one of the input voltages INP and INN has non-zero voltage, the other one will be 0V.

The operation amplifier OP21 is operated under VDDA and VSSA. The operation amplifier OP21 has an inverting input terminal, a non-inverting input terminal and an output terminal. The operation amplifier OP21 receives a positive input voltage INP via the non-inverting input terminal. The positive input voltage INP has a voltage swing between +5V and 0V. The output signal from the output terminal of the operation amplifier OP21 is feedback to the inverting input terminal of the operation amplifier OP21. In other words, the operation amplifier OP21 has a unity gain.

The operation amplifier OP22 is operated under VDDAN and VSSA. The operation amplifier OP22 has an inverting input terminal, a non-inverting input terminal and an output terminal. The operation amplifier OP22 receives a negative input voltage INN via the non-inverting input terminal. The negative input voltage INN has a voltage swing between −5V and 0V. The output signal from the output terminal of the operation amplifier OP22 is feedback to the inverting input terminal of the operation amplifier OP22. In other words, the operation amplifier OP22 has a unity gain.

The inverter INV21 receives and inverts an enable signal ENP into an inverted signal thereof. The inverter INV21 is operated under VDDA and VSSA. The enable signal ENP is further coupled to the transmission gate TM21. The inverted signal of the enable signal ENP output from the inverter INV21 is also coupled to the transmission gate TM21. The enable signal ENP has at least two logic states, positive logic high state (+5V) and logic low state (0V).

The inverter INV22 receives and inverts another enable signal ENN into an inverted signal thereof. The inverter INV22 is operated under VDDAN and VSSA. The enable signal ENN is further coupled to the transmission gate TM22. The inverted signal of the enable signal ENN output from the inverter INV22 is also coupled to the transmission gate TM22. The enable signal ENN has at least two logic states, negative logic high state (−5V) and logic low state (0V).

The transmission gate TM21 receives the output signal from the operation amplifier OP21. The transmission gate TM21 is operated under VDDA and VSSA. The transmission gate TM21 is conducted or non-conducted under control of the enable signal ENP and the inverted signal of the enable signal ENP. When the enable signal ENP is in the positive logic high state, the transmission gate TM21 is conducted. When the enable signal ENP is in the logic low state, the transmission gate TM21 is non-conducted. The transmission gate TM21 generates an output signal PNET to the switches TP21 and TN22. In general, when the transmission gate TM21 is conducted, the output signal PNET from the transmission gate TM21 has the same voltage value as the positive input voltage INP.

The transmission gate TM22 receives the output signal from the operation amplifier OP22. The transmission gate TM22 is operated under VDDAN and VSSA. The transmission gate TM22 is conducted or non-conducted under control of the enable signal ENN and the inverted signal of the enable signal ENN. When the enable signal ENN is in the logic low state, the transmission gate TM22 is conducted. When the enable signal ENN is in the negative logic high state, the transmission gate TM22 is non-conducted. The transmission gate TM21 generates an output signal PNET to the switches TP21 and TN22. The transmission gate TM22 generates an output signal NNET to the switches TN21 and TP22. In general, when the transmission gate TM22 is conducted, the output signal NNET from the transmission gate TM22 has the same voltage value as the negative input voltage INN.

In the embodiment, the switches TP21~TP22 and TN21~TN22 are implemented by P-type MOSFETs and N-type MOSFETs, respectively. However, the invention is not limited thereby.

The switch TP21 has a source terminal coupled to the output signal PNET from the transmission gate TM21, a gate terminal receiving a switch control signal SWN and a drain terminal coupled to an output signal SOUT of the output circuit. Further, the bulk terminal of the switch TP21 is coupled to the source terminal of the switch TP21. The switch control signal SWP has at least two logic states, negative logic high state (−1.8V) and logic low state (0V).

The switch TP22 has a source terminal coupled to VSSA, a gate terminal receiving a switch control signal SWNB and a drain terminal coupled to the output signal NNET from the transmission gate TM22. Further, the bulk terminal of the switch TP22 is coupled to the source terminal of the switch TP22. The switch control signal SWNB has at least two logic states, negative logic high state (−5V) and logic low state (0V).

The switch TN21 has a source terminal coupled to the output signal NNET from the transmission gate TM22, a gate terminal receiving a switch control signal SWP and a drain terminal coupled to the output signal SOUT of the output circuit. Further, the bulk terminal of the switch TN21 is coupled to the source terminal of the switch TN21. The switch control signal SWN has at least two logic states, positive logic high state (+1.8V) and logic low state (0V).

The switch TN22 has a source terminal coupled to VSSA, a gate terminal receiving a switch control signal SWPB and a drain terminal coupled to the output signal PNET from the transmission gate TM21. Further, the bulk terminal of the switch TN22 is coupled to the source terminal of the switch TN22. The switch control signal SWPB has at least two logic states, positive logic high state (+5V) and logic low state (0V).

In this embodiment, the positive input voltage INP has a voltage swing between VDDA (+5V) and VSSA (0V) and the negative input voltage INN has a voltage swing between VDDAN (−5V) and VSSA (0V). Further, four scenarios are described below. In scenario A, the positive input voltage INP is between VDDA and 0.5*VDDA, i.e. +5V~+2.5V. In scenario B, the positive input voltage INP is between 0V and 0.5*VDDA, i.e. 0V~+2.5V. In scenario C, the negative input voltage INN is between VDDAN and 0.5*VDDAN, i.e. −5V~−2.5V. In scenario D, the negative input voltage INN is between 0 and 0.5*VDDAN, i.e. 0V~−2.5V.

Scenario A: INP Between VDDA~0.5*VDDA

In scenario A, the signals ENP, SWPB, SWP, ENN, SWNB and SWN are positive logic high (+5V), logic low (0V), logic low (0V), negative logic high (−5V), negative logic high (−5V) and logic low (0V), respectively. Therefore, the transmission gate TM21, the switches TP21 and TP22 are turned on; and the transmission gate TM22, the switches TN21 and TN22 are turned off. Because the transmission gate TM21 is turned on, the output signal from the operation amplifier OP21, having the same voltage value as the positive input voltage INP, is passed by the transmission gate TM21 and the output signal PNET from the transmission gate TM21 has the same voltage value as the positive input voltage INP. Because the switch TP21 is turned on, the output signal SOUT has the same voltage value as the output signal PNET. In other words, SOUT=PNET=INP. In scenario A, the reason why the switch TP22 is turned on relies on that, in worst case, if in initial state, the signal NNET has a non-zero negative voltage value, the ON switch TP22 pulls high the signal NNET to 0V. Under scenario A, $V_{SG}$ and $V_{DG}$ of the switches TP21 and TP22 and $V_{GS}$ and $V_{GD}$ of the switches TN21 and TN22 are listed as Table 1.

TABLE 1

| | TP21 | TP22 | | TN21 | TN22 |
|---|---|---|---|---|---|
| $V_{SG}$ | +2.5 V~+5 V | +5 V | $V_{GS}$ | 0 V | 0 V |
| $V_{DG}$ | +2.5 V~+5 V | +5 V | $V_{GD}$ | −5 V~−2.5 V | −5 V~−2.5 V |

From Table 1, it is known that, $V_{SG}$ (or $V_{GS}$) and $V_{DG}$ (or $V_{GD}$) of anyone of the switches in scenario A is not higher than +5V (or −5V).

Scenario B: INP Between VSSA~0.5*VDDA

In scenario B, the signals ENP, SWPB, SWP, ENN, SWNB and SWN are positive logic high (+5V), logic low (0V), negative logic high (−1.8V), negative logic high (−5V), negative logic high (−5V) and logic low (0V), respectively. Therefore, the transmission gate TM21, the switches TP21 and TP22 are turned on; and the transmission gate TM22, the switches TN21 and TN22 are turned off. Because the transmission gate TM21 is turned on, the output signal from the operation amplifier OP21, having the same voltage value as the positive input voltage INP, is passed by the transmission gate TM21 and the output signal PNET from the transmission gate TM21 has the same voltage value as the positive input voltage INP. Because the switch TP21 is turned on, the output signal SOUT has the same voltage value as the output signal PNET. In other words, SOUT=PNET=INP. In scenario B, the reason why the switch TP22 is turned on is similar to that in scenario A. In other words, in worst case, if in initial state, the signal NNET has a non-zero negative voltage value, the ON switch TP22 pulls high the signal NNET to 0V. Under scenario B, $V_{SG}$ and $V_{DG}$ of the switches TP21 and TP22 and $V_{GS}$ and $V_{GD}$ of the switches TN21 and TN22 are listed as Table 2.

TABLE 2

| | TP21 | TP22 | | TN21 | TN22 |
|---|---|---|---|---|---|
| $V_{SG}$ | +1.8 V~+4.3 V | +5 V | $V_{GS}$ | 0 V | 0 V |
| $V_{DG}$ | +1.8 V~+4.3 V | +5 V | $V_{GD}$ | −2.5 V~0 V | −2.5 V~0 V |

From Table 2, it is known that, $V_{SG}$ (or $V_{GS}$) and $V_{DG}$ (or $V_{GD}$) of anyone of the switches in scenario B is not higher than +5V (or −5V).

Scenario C: INN Between 0.5*VDDAN~VDDAN

In scenario C, the signals ENP, SWPB, SWP, ENN, SWNB and SWN are logic low (0V), positive logic high (+5V), logic low (0V), logic low (0V), logic low (0V) and logic low (0V), respectively. Therefore, the transmission gate TM21, the switches TP21 and TP22 are turned off; and the transmission gate TM22, the switches TN21 and TN22 are turned on. Because the transmission gate TM22 is turned on, the output signal from the operation amplifier OP22, having the same voltage value as the positive input voltage INN, is passed by the transmission gate TM22 and the output signal NNET from the transmission gate TM22 has the same voltage value as the positive input voltage INN. Because the switch TN21 is turned on, the output signal SOUT has the same voltage value as the output signal NNET. In other words, SOUT=NNET=INN. In scenario C, the reason why the switch TN22 is turned on is similar to that in scenario A. In other words, in worst case, if in initial state, the signal PNET has a non-zero positive voltage value, the ON switch TN22 pulls low the signal PNET to 0V. Under scenario C, $V_{SG}$ and $V_{DG}$ of the switches TP21 and TP22 and $V_{GS}$ and $V_{GD}$ of the switches TN21 and TN22 are listed as Table 3.

TABLE 3

| | TP21 | TP22 | | TN21 | TN22 |
|---|---|---|---|---|---|
| $V_{SG}$ | 0 V | 0 V | $V_{GS}$ | +2.5 V~+5 V | +5 V |
| $V_{DG}$ | −2.5 V~−5 V | −2.5 V~−5 V | $V_{GD}$ | +2.5 V~+5 V | +5 V |

From Table 3, it is known that, $V_{SG}$ (or $V_{GS}$) and $V_{DG}$ (or $V_{GD}$) of anyone of the switches in scenario C is not higher than +5V (or −5V).

Scenario D: INN Between 0.5*VDDAN~VSSA

In scenario D, the signals ENP, SWPB, SWP, ENN, SWNB and SWN are logic low (0V), positive logic high (+5V), logic low (0V), logic low (0V), logic low (0V) and positive logic high (+1.8V), respectively. Therefore, the transmission gate TM21, the switches TP21 and TP22 are turned off; and the transmission gate TM22, the switches TN21 and TN22 are turned on. Because the transmission gate TM22 is turned on, the output signal from the operation amplifier OP22, having the same voltage value as the positive input voltage INN, is passed by the transmission gate TM22 and the output signal NNET from the transmission gate TM22 has the same voltage value as the positive input voltage INN. Because the switch TN21 is turned on, the output signal SOUT has the same voltage value as the output signal NNET. In other words, SOUT=NNET=INN. In scenario D, the reason why the switch TN22 is turned on is similar to that in scenario A. In other words, in worst case, if in initial state, the signal PNET has a non-zero positive voltage value, the ON switch TN22 pulls low the signal PNET to 0V. Under scenario D, $V_{SG}$ and $V_{DG}$ of the switches TP21 and TP22 and $V_{GS}$ and $V_{GD}$ of the switches TN21 and TN22 are listed as Table 4.

TABLE 4

| | TP21 | TP22 | | TN21 | TN22 |
|---|---|---|---|---|---|
| $V_{SG}$ | 0 V | 0 V | $V_{GS}$ | +1.8 V~+4.3 V | +5 V |
| $V_{DG}$ | −2.5 V~0 | −2.5 V~0 | $V_{GD}$ | +1.8 V~+4.3 V | +5 V |

From Table 4, it is known that, $V_{SG}$ (or $V_{GS}$) and $V_{DG}$ (or $V_{GD}$) of anyone of the switches in scenario D is not higher than +5V (or −5V).

From the above description, in any scenario, voltage drop between any two terminals of any of the switches TP21~TP21 and TN21~TN22 is not higher than +5V (VDDA) or −5V (VDDAN). Therefore, in the embodiment, the output signal SOUT from the output circuit has a voltage swing of +5V~−5V by using switches having low voltage tolerance, for example, only 5V tolerance. A switch having low voltage tolerance has a reduced circuit layout. Thus, the output circuit in the embodiment has a reduced circuit area.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An output circuit suitable in a driving circuit for a display device, the output circuit including:

a first operation amplifier, receiving a first input voltage;

a second operation amplifier, receiving a second input voltage;

a first transmission gate, passing an output signal from the first operation amplifier under control of a first enable signal;

a second transmission gate, passing an output signal from the second operation amplifier under control of a second enable signal;

a first switch, passing an output signal from the first transmission gate under control of a first switch control signal for generating an output signal of the output circuit;

a second switch, passing an output signal from the second transmission gate under control of a second switch control signal for generating the output signal of the output circuit;

a third switch, pulling up the output signal from the second transmission gate under control of a third switch control signal; and a fourth switch, pulling down the output signal from the first transmission gate under control of a fourth switch control signal.

2. The output circuit of claim 1, further including:

a first inverter, receiving and inverting the first enable signal for generating an inverted signal thereof, the first transmission gate being conducted or non-conducted based on the first enable signal and the inverted signal thereof; and a second inverter, receiving and inverting the second enable signal for generating an inverted signal thereof, the second transmission gate being conducted or non-conducted based on the second enable signal and the inverted signal thereof.

3. The output circuit of claim 2, wherein power supplies for the first operation amplifier, the first inverter and the first transmission gate are a first reference voltage and a second reference voltage.

4. The output circuit of claim 3, wherein power supplies for the second operation amplifier, the second inverter and the second transmission gate are a third reference voltage and the second reference voltage.

5. The output circuit of claim 4, wherein when the first input voltage is between a first range, the first enable signal, the first switch control signal and the third switch control signal are as positive logic high, logic low and negative logic high respectively, so the output signal from the first transmission gate is the same as the first input voltage, the first switch is ON for generating the output signal of the output circuit as the first input voltage, the third switch is ON for pulling up the output signal from the second transmission gate to the second reference voltage.

6. The output circuit of claim 5, wherein when the first input voltage is between the first range, the second enable signal is as negative logic high for making the second transmission gate conducted and the second and fourth switch control signals are both logic low for making the second and fourth switches both OFF.

7. The output circuit of claim 5, wherein the first range is VDDA~0.5*VDDA, and VDDA refers to the first reference voltage.

8. The output circuit of claim 4, wherein when the first input voltage is between a second range, the first enable signal, the first switch control signal and the third switch control signal are as positive logic high, negative logic high and negative logic high, respectively, so the output signal from the first transmission gate is the same as the first input voltage, the first switch is ON for generating the output signal of the output circuit as the first input voltage, the third switch is ON for pulling up the output signal from the second transmission gate to the second reference voltage.

9. The output circuit of claim 8, wherein when the first input voltage is between the second range, the second enable signal is as negative logic high for making the second transmission gate conducted and the second and fourth switch control signals are both logic low for making the second and fourth switches both OFF.

10. The output circuit of claim 8, wherein the second range is 0V~0.5*VDDA, and VDDA refers to the first reference voltage.

11. The output circuit of claim 4, wherein when the second input voltage is between a third range, the second enable signal, the second switch control signal and the fourth switch control signal are as logic low, logic low and positive logic high respectively, so the output signal from the second transmission gate is the same as the second input voltage, the second switch is ON for generating the output signal of the output circuit as the second input voltage, the fourth switch is ON for pulling down the output signal from the first transmission gate to the second reference voltage.

12. The output circuit of claim 11, wherein when the second input voltage is between the third range, the first enable signal is as logic low for making the first transmission gate conducted and the first and third switch control signals are both logic low for making the first and third switches both OFF.

13. The output circuit of claim 11, wherein the third range is 0.5*VDDAN~VDDAN, and VDDAN refers to the third reference voltage.

14. The output circuit of claim 4, wherein when the second input voltage is between a fourth range, the second enable signal, the second switch control signal and the fourth switch control signal are as logic low, positive logic high and positive logic high respectively, so the output signal from the second transmission gate is the same as the second input voltage, the second switch is ON for generating the output signal of the output circuit as the second input voltage, the fourth switch is ON for pulling down the output signal from the first transmission gate to the second reference voltage.

15. The output circuit of claim 14, wherein when the second input voltage is between the fourth range, the first enable signal is as logic low for making the first transmission gate conducted and the first and third switch control signals are both logic low for making the first and third switches both OFF.

16. The output circuit of claim 14, wherein the fourth range is 0V~0.5*VDDAN, and VDDAN refers to the third reference voltage.

17. A method for driving a display device, comprising the steps of:

amplifying a first input voltage or a second input voltage;

passing the amplified first input voltage under control of a first enable signal;

passing the amplified second input voltage under control of a second enable signal;

switching the passed and amplified first input voltage as a driving voltage for the display device under control of a first switch control signal; and switching the passed and amplified second input voltage as the driving voltage for the display device under control of a second switch control signal.

18. The method of claim 17, further including:

inverting the first enable signal for generating an inverted signal thereof; and inverting the second enable signal for generating an inverted signal thereof.

19. The method of claim 18, wherein the step of passing the amplified first in put voltage includes a step of passing the amplified first input voltage under control of the first enable signal and the inverted signal thereof.

20. The method of claim 18, wherein the step of passing the amplified second input voltage includes a step of passing the amplified second input voltage under control of the second enable signal and the inverted signal thereof.

21. The method of claim 17, further including a step of:

pulling up the passed and amplified second input voltage under control of a third switch control signal.

22. The method of claim 17, further including a step of:

pulling down the passed and amplified first input voltage under control of a fourth switch control signal.

23. The method of claim 17, wherein when the first input voltage is between a first range or a second range, the first input voltage is output as the driving voltage.

24. The method of claim 17, wherein when the first input voltage is between a third range or a fourth range, the second input voltage is output as the driving voltage.

25. The method of claim 17, wherein the step of amplifying the first input voltage or the second input voltage includes a step of amplifying the first input voltage or the second input voltage in unity gain.

* * * * *